United States Patent [19]

Herrera

[11] 3,946,856

[45] Mar. 30, 1976

[54] APPARATUS FOR PROOFING LUMPS OF DOUGH

[75] Inventor: Frank J. Herrera, Downey, Calif.

[73] Assignee: Casa Herrera, Inc., Los Angeles, Calif.

[22] Filed: Aug. 13, 1974

[21] Appl. No.: 497,016

[52] U.S. Cl. .................................. 198/84; 198/164
[51] Int. Cl.² ........................................ B65G 37/00
[58] Field of Search ........... 198/25, 26, 63, 84, 103, 198/164, 197, 198, 165

[56] References Cited
UNITED STATES PATENTS

| | | | |
|---|---|---|---|
| 1,115,621 | 11/1914 | van Houten | 198/84 |
| 1,157,209 | 10/1915 | Converse | 198/164 |
| 1,585,275 | 5/1926 | Albrecht | 198/84 |
| 1,998,912 | 4/1935 | Troy | 198/84 |
| 2,740,244 | 4/1956 | Belli | 198/197 X |
| 2,769,376 | 11/1956 | Chidsey, Jr. et al. | 198/164 X |
| 2,923,138 | 2/1960 | Rollins | 198/84 X |
| 3,055,490 | 9/1962 | Anderson | 198/211 |
| 3,151,731 | 10/1964 | Harrison et al. | 198/103 X |
| 3,568,820 | 3/1971 | Patch | 198/84 |
| 3,669,238 | 6/1972 | Folkes et al. | 198/137 X |

FOREIGN PATENTS OR APPLICATIONS

| | | | |
|---|---|---|---|
| 305,996 | 8/1916 | Germany | 198/165 |

*Primary Examiner*—Evon C. Blunk
*Assistant Examiner*—Richard K. Thomson
*Attorney, Agent, or Firm*—Benoit Law Corporation

[57] ABSTRACT

Apparatus for proofing lumps of dough comprises a series of elongate conveyors for successively transporting the lumps of dough, equipment for mounting the elongate conveyors in a spatially staggered relationship, a plurality of auxiliary conveying systems each associated with a different pair of elongate conveyors for transferring lumps of dough from an end of one conveyor of the particular pair to a portion of the other conveyor of that particular pair, equipment for feeding lumps of dough to the first and from the last elongate conveyor in the series, an enclosure for the elongate conveyors and the auxiliary conveying systems, and equipment for providing inside the enclosure a proofing environment for the lumps of dough. Said auxiliary conveying systems include a further endless conveyor loop being smaller than each of said conveyor loops of said series of elongate conveyors, equipment for mounting said further conveyor loop in the vicinity of an adjacent pair of elongate conveyors at a spacing from the adjacent pair of elongate conveyors sufficient for the transfer of lumps of dough between said further endless conveyor loop and the adjacent pair of elongate conveyors, equipment for driving said further endless conveyor loop and said distinct endless conveyor loops in mutual synchronism, said mounting equipment including a curved support for guiding said further conveyor loop in a concave path adjacent the latter pair of elongate conveyors and a spaced pair of retaining strips for retaining and guiding edge portions of said further conveyor loop in said concave path.

8 Claims, 7 Drawing Figures

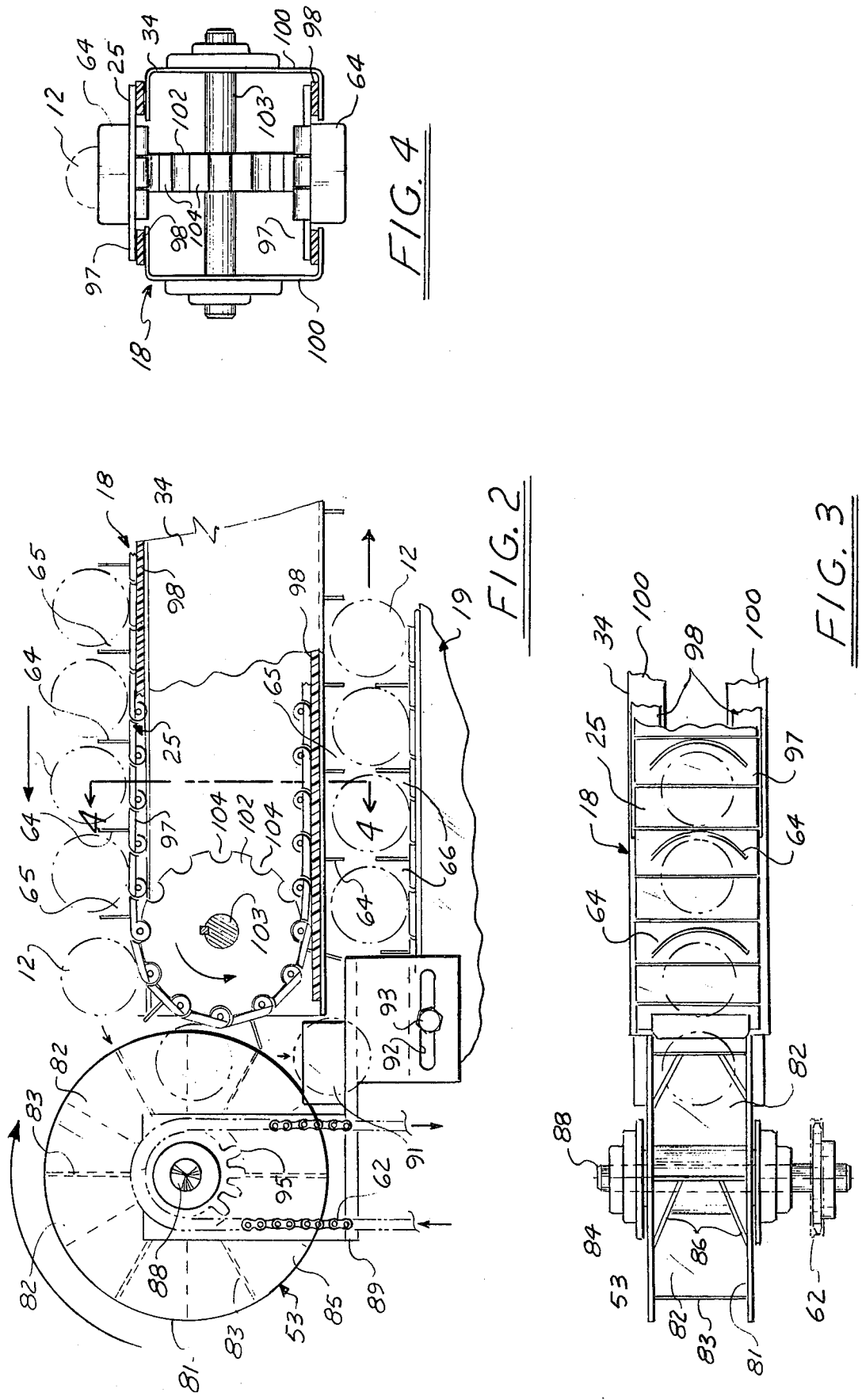

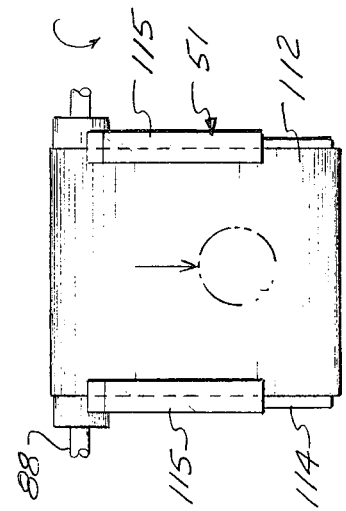
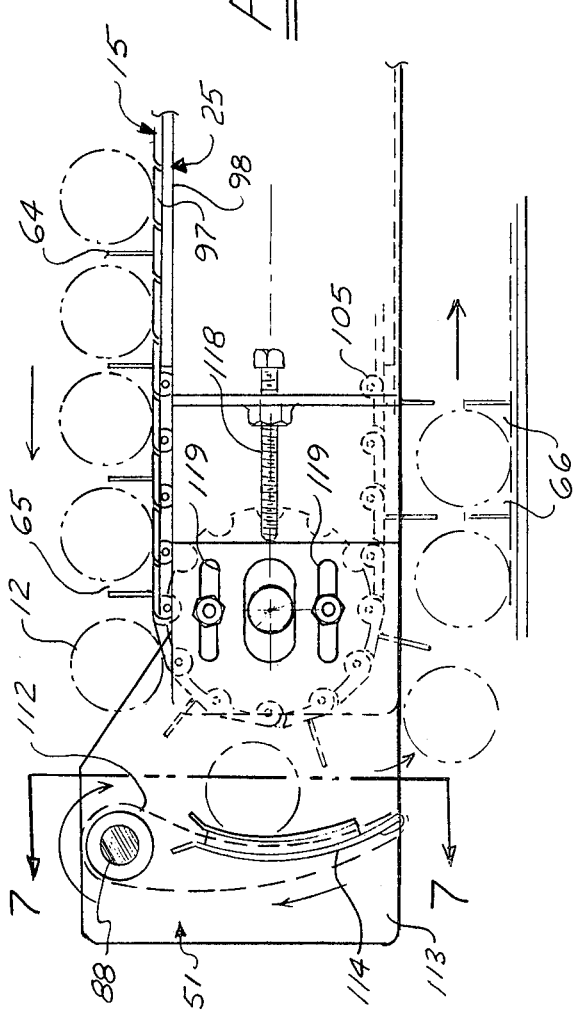
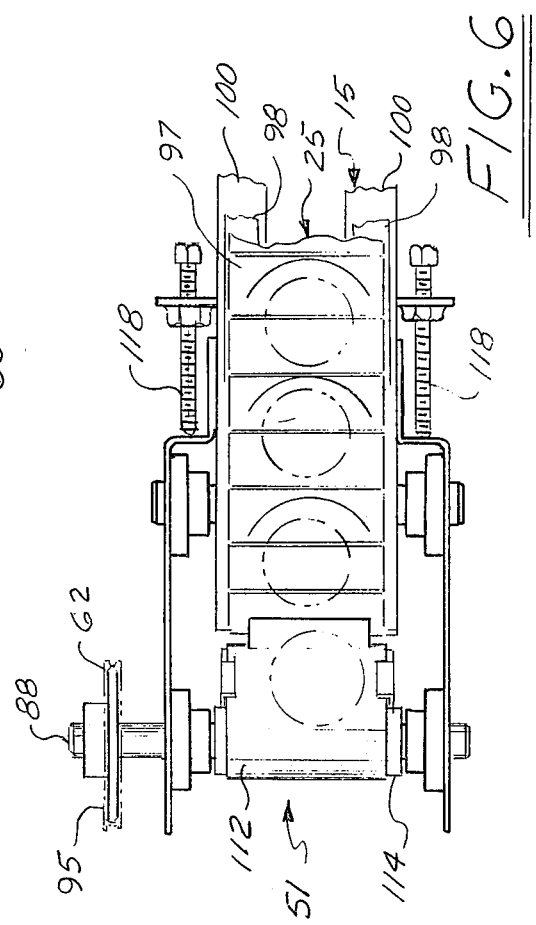

APPARATUS FOR PROOFING LUMPS OF DOUGH

BACKGROUND OF THE INVENTION

1. Field of the Invention

The subject invention relates to automatic bakery machinery and, more particularly, to apparatus for proofing or similarly processing lumps of dough.

2. Description of the Prior Art

Several instances are known in the art of baking or dough processing which require dough to be brought to a proper condition for a subsequent operation. For instance, after dough has been divided into lumps, the lumps are rounded up and the rounded up lumps are allowed to stand a given time to recuperate from the dividing and rounding up action, before they are processed further. Similarly, it is frequently necessary to bring lumps of dough to a certain humidity or temperature level which renders them suitable for a desired operation. Frequently, time delays in the handling of dough are necessary to permit dough to rise under the influence of yeast or a similar agent, or in order to enable another desired chemical reaction inside the dough.

These and other processes which require lumps of dough to be subjected to a delayed time action or to a controlled period of inaction are herein consolidated under the designation "proofing", with the latter term being employed in a broad and generic sense without any intention of limitation to a strict and technical meaning.

In terms of human history, the classical method for providing the time element requisite to the proofing of dough has been and for the most part still is letting the dough rest for a while in a stationary condition.

In modern bakery enterprises, this time-honored method has brought about considerable inconvenience, as the lumps of dough in question typically had to be gathered onto pans with the aid of manual labor and, after the proofing step, had to be redistributed into the further manufacturing process.

With the advent of the machine age, various attempts were made to mechanize the proofing process. While some limited success was achieved in this area, the need for reliable and effective automatic proofing equipment has persisted up to the present.

SUMMARY OF THE INVENTION

It is an object of this invention to overcome the above mentioned disadvantages.

It is a related object of the invention to provide improved equipment for proofing lumps of dough.

Other objects of the invention will become apparent in the further course of this disclosure.

The invention resides in apparatus for proofing lumps of dough comprising in combination a series of elongate conveyors for successively transporting the lumps of dough, each conveyor having its own distinct endless conveyor loop, means for mounting the elongate conveyors in a spatially staggered relationship, means coupled to the conveyors for driving the endless conveyor loops of the conveyors, a plurality of auxiliary conveying systems each associated with a different pair of elongate conveyors for transferring lumps of dough from an end of one conveyor of the particular pair to a portion of the other conveyor of that particular pair spaced from an end of that other conveyor, means for feeding lumps of dough to a first elongate conveyor in the series, means for deriving transported lumps of dough from a last elongate conveyor in the series, enclosure means for the elongate conveyors and the auxiliary conveying systems, and means for providing inside the enclosing means a proofing environment for the lumps of dough. According to the subject invention, said auxiliary conveying systems include a further endless conveyor loop being smaller than each of said conveyor loops of said series of elongate conveyors, means for mounting said further conveyor loop in the vicinity of an adjacent pair of elongate conveyors at a spacing from the adjacent pair of elongate conveyors sufficient for the transfer of lumps of dough between said further endless conveyor loop and the adjacent pair of elongate conveyors, and means for driving said further endless conveyor loop and said distinct endless conveyor loops in mutual synchronism, said mounting means including a curved support for guiding said further conveyor loop in a concave path adjacent the latter pair of elongate conveyors and a spaced pair of retaining strips for retaining and guiding edge portions of said further conveyor loop in said concave path.

By way of example, the latter proofing environment may comprise or involve the provision of a controlled humidity and temperature atmosphere.

In accordance with a preferred embodiment of the subject invention, each elongate conveyor has a series of distinct compartments distributed along its conveyor loop for receiving lumps of dough, the mentioned mounting means include means for mounting adjacent pairs of conveyors in such proximity that corresponding compartments of conveyors in each adjacent pair of conveyors form traveling chambers for receiving lumps of dough, the mentioned driving means include means for moving adjacent compartments in temporal synchronism and spatial coincidence, and the mentioned auxiliary conveying systems include means for transferring lumps of dough from compartments of a conveyor to chambers between conveyors of an adjacent pair of conveyors.

The expression "chambers" as herein employed is not intended to be limited to any closed structure. Rather, chambers may simply be formed by adjacent and sometimes even mutually spaced compartments, as will become more readily apparent in the further course of this disclosure.

In accordance with a further preferred embodiment of the subject invention, the mentioned auxiliary conveying systems include at least one rotary structure for conveying lumps of dough, and means for driving this rotary structure.

In accordance with another preferred embodiment of the subject invention, the mentioned auxiliary conveying systems include a further endless conveyor loop being smaller than each of the conveyor loops of the series of elongate conveyors, means for mounting the further conveyor loop in the vicinity of an adjacent pair of elongate conveyors, and means for driving the further endless conveyor loop.

BRIEF DESCRIPTION OF THE DRAWINGS

The subject invention and its objects and aspects will become more readily apparent from the following detailed description of preferred embodiments thereof, illustrated by way of example in the accompanying drawings, in which like reference numerals designate like or functionally equivalent parts, and in which:

FIG. 2 is a side view on an enlarged scale, of a detail of the apparatus of FIG. 1, concerning an auxiliary conveyor in accordance with a preferred embodiment of the subject invention;

FIG. 3 is a top view of the equipment shown in FIG. 2;

FIG. 4 is a part of a section taken along the line 4 — 4 in FIG. 2;

FIG. 5 is a side view on an enlarged scale of a further detail of the apparatus of FIG. 1, showing another auxiliary conveyor in accordance with a further preferred embodiment of the subject invention;

FIG. 6 is a top view of the equipment shown in FIG. 5; and

FIG. 7 is a view taken along the line 7 — 7 in FIG. 5.

DESCRIPTION OF PREFERRED EMBODIMENTS

Figure 1:
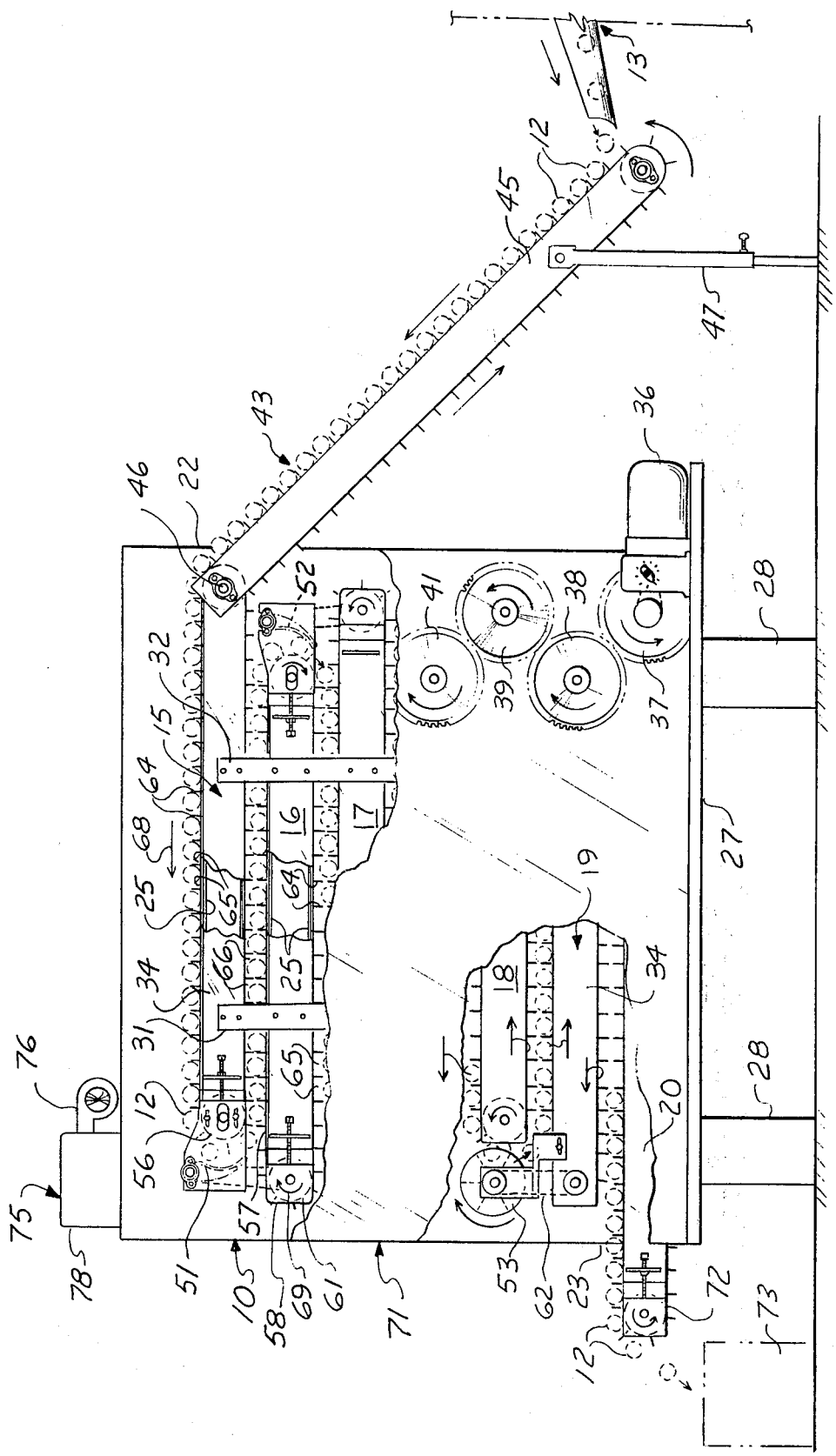
FIG. 1 is a side view, partially broken away of proofing equipment in accordance with a preferred embodiment of the subject invention.

The proofing machine or proofer 10 shown in the drawings is provided with lumps of dough in the form of dough balls 12 from a schematically illustrated supply 13.

Conventional machines, such as "Union Bun Machines" (not shown) exist for forming the balls of dough 12 from a mass of flour dough.

The proofer 10 comprises a series of elongate conveyors, six of which are visible at 15 to 20, for successively transporting the dough balls 12 from a proofer inlet 22 to an outlet 23. Each conveyor 15 to 20 has its own distinct endless conveyor loop 25 as specifically shown for the conveyors 15 and 16.

The elongate conveyors 15 to 20 are mounted into a spatially staggered relationship as seen in FIG. 1 whereby the ends of adjacent conveyors are offset relative to each other.

The proofer 10 has a base 27 which resets on legs 28. Uprights 31 and 32 are attached to and rise from the base 27. Each of the elongate conveyors 15 to 20 has a conveyor frame 34 attached to the uprights 31 and 32.

The endless conveyor loops 25 of the elongate conveyors 15 to 20 are driven by a variable speed electric motor 36 via meshing gear wheels, four of which are seen at 37 to 41.

In practice, each gear wheel rotates a conventional roller or sprocket wheel (not shown) which engages and drives the endless conveyor loop 25 of a different one of the elongate conveyors 15 to 20. A chief purpose of the meshing gear wheels 37 etc. is to assure perfect temporal and spatial mutual synchronism of the conveyors 15 to 20.

By way of example, the endless conveyor loops 25 may comprise a conveyor belt or a series of interconnected articulate conveyor links or members.

In the preferred embodiment illustrated in FIG. 1, the means for feeding the dough balls 12 via the proofer input 22 to the first or top conveyor 15 in the series of conveyors 15 to 20 include an extension of the endless conveyor loop 25 of the first conveyor 15 to a feeding region outside the proofer enclosure in the vicinity of the dough ball supply 13. The feeder extension 43 has its own conveyor frame 45 which is attached to the top conveyor 15 at 46 and supported by its own legs 47.

In accordance with the subject invention, the proofer 10 includes a plurality of auxiliary conveying systems, some of which are seen at 51, 52 and 53. Each of these auxiliary conveying systems 51 etc. is associated with a different pair of elongate conveyors. In this respect, it is to be noted that the conveyors 15 and 16, for instance, may be considered as belonging to a first pair of adjacent conveyors, while the conveyors 16 and 17 may be considered as belonging to a second pair of adjacent conveyors.

In that case, the conveyor 16 is common to both of these pairs.

Because of the illustrated positioning of the auxiliary conveying systems 51 etc. and the staggered relationship of the conveyors 15 to 20, each auxiliary conveying system transfers dough balls 12 from an end of one conveyor of a particular pair of adjacent conveyors to a predetermined portion of the conveyor of that pair. That predetermined portion onto which the transferred dough balls are deposited is spaced from the end of that other conveyor.

The latter will now be more fully explained with the aid of FIG. 1. In particular, the top auxiliary conveying system 51 transfers dough balls 12 from an end 56 of the top conveyor 16 to a portion 57 of the next lower conveyor 16. As seen in FIG. 1, that portion 57 is spaced from the end 58 of the conveyor 16, which improves the positioning of the transferred balls onto the endless loops 25 of the conveyor 16.

In accordance with a preferred embodiment of the invention, each of the auxiliary conveying systems 51, 52 and 53 is driven in mutual synchronism with its adjacent conveyors. To this end, the roller or sprocket 61 which supports the endless conveyor loop 25 of the conveyor 16, and which is rotated by that conveyor loop, drives the auxiliary conveying system 15 via a drive chain 62.

The auxiliary conveying systems 52 and 53 are similarly driven from adjacent conveyor loops.

Each of the conveyors 15 to 20 is compartmentalized by a series of conveyor cleats 64 which are attached to the endless conveyor loops 25. In this manner, each elongate conveyor has a series of distinct compartments 65 distributed along its conveyor loop 25 for receiving the dough balls 12. The uprights 31 and 32 mount adjacent pairs of conveyors in such proximity that corresponding compartments 65 of conveyors in each adjacent pair of conveyors form traveling chambers 66 for receiving the dough balls 12. In practice, these chambers 66 need not be completely enclosed. Rather, they are delimited by adjacent cleats 64 and by portions of the endless conveyor loops 25 as seen in FIG. 1. To preserve the integrity of the chambers 66, the conveyor cleats 64 are moved in synchronism and spatial coincidence. The same applies to the compartments 66 themselves.

The auxiliary conveying system 51 and 53 then transfer dough balls 12 from compartments 65 of a conveyor to chambers 66 between conveyors of an adjacent conveyor pair. By way of example, the auxiliary conveying system 51 transfers dough balls from compartments 65 of the conveyor 15 to chambers 66 between the conveyors 15 and 16. To render this possible, the endless conveyor loops 55 of the pair of adjacent conveyors 15 and 16 are driven in opposite senses as seen from a comparison of the arrow 68 with the arrow 69 shown in FIG. 1. Unmarked further arrows in FIG. 1 indicate that the other endless conveyor loops of pairs of adjacent conveyors are also driven in opposite senses by the drive including the motor 36 and the gear wheels 37 to 41.

An enclosure 71, which may be formed of stainless steel panels or other suitable material, houses the endless conveyors 15 to 20 and the auxiliary conveying systems 51 to 53 etc. An extension 72 of the lower or bottom conveyor serves as a means for deriving transported dough balls 12 from the last elongate conveyor in the series. A receptacle 73 symbolizes a means for processing the derived dough balls. In practice, the proofed dough balls may be processed in any desired manner and with any suitable machinery. By way of example, the proofed dough balls may be supplied to a flour head or similar equipment (not shown) for rolling the proofed dough balls into sheets of dough for the manufacture of tortillas, pizzas, pies, or other bakery goods.

The proofer 10 further includes equipment 75 for providing inside the enclosure 71 a proofing environment for the dough balls 12. The term "proofing environment" is herein employed to designate the requisite environment or atmosphere for accomplishing a desired proofing effect, as generally well known in the art. In the illustrated preferred embodiment, the equipment 75 includes an air blower 76 feeding air to a humidifier and heater 78 which provides the requisite humidity and temperature environment inside the proofer 10.

As seen in FIGS. 2 to 4, the auxiliary conveying systems may include at least one rotary structure for conveying lumps or balls of dough 12 from the conveyor 18 to the conveyor 19, for instance, and means 62 for driving the rotary structure 53.

As indicated above, the drive means 62 are preferably geared to one of the conveyors, such as the conveyor 19 to assure mutual synchronism among the rotary structure 53 and the adjacent conveyors 18 and 19.

In accordance with the preferred embodiment illustrated in FIGS. 2 and 3, the auxiliary conveying system includes a wheel structure 81 for conveying the dough balls 12. The wheel structure 81 includes circumferentially distributed compartments 82 for receiving the dough balls 12. The compartments are defined by paddles or dividers 83 arranged in a radial fashion. Two sheaves 84 and 85 laterally define the wheel 81. Guides or deflectors 86 properly center the dough balls 12 inside the wheel structure.

The wheel structure 81 further has a shaft 88 for rotatably mounting the wheel structure to an adjustable mount 89. Lateral deflectors on the mount, one of which is visible at 91, help to center conveyed dough balls 12 relative to the conveyor 19. An elongate slot 92 in the mount 89 and a corresponding set screw 93 render the mount adjustable so that the spacing of the wheel structure 81 relative to the end of the elongate conveyor 18 can be adjusted to accommodate different sizes of dough balls 12.

As best seen in FIG. 2, the desired synchronism of the wheel structure 81 is achieved by the use of a drive chain 82 cooperating with a sprocket 95 attached to the shaft 88. It is, however, to be understood that other synchronous drive means, such as those involving timing belts and bead chains, may be employed if desired.

Further in accordance with the preferred embodiment illustrated in FIGS. 2 to 4, the endless conveyor loop 25 may be composed of a series of links or conveyor elements 97 which may be interconnected in a male-and-female fashion in a conventional manner.

The links 97 ride on strips 98 of Teflon or another low-friction material attached to the conveyor frame 100.

The conveyor 18 further includes a sprocket 102 for supporting the endless loop 25. A shaft 103 rotatably mounts the sprocket 102. The sprocket 102 has circumferential indentations 104 at which the sprocket wheel is engaged by corresponding protuberances 105 of the endless conveyor loop 25. In this manner, the sprocket wheel 102 is caused to rotate in synchronism with the conveyor loop 25. For synchronism of the wheel structure 81 with the adjacent conveyors, the drive chain 82 may be driven by a shaft corresponding to the shaft 103 shown in FIG. 2 and being associated with the conveyor 19.

The auxiliary conveying system 51 shown in FIGS. 5 to 7 includes a further endless conveyor loop 112 being smaller than each of the conveyor loops 25 of the series of elongate conveyors 15 to 20. A mount 113 positions the conveyor loop in the vicinity of an adjacent pair of elongate conveyors at a spacing from the adjacent pair of elongate conveyors sufficient for the transfer of the dough balls 12 between the further endless conveyor loop and the adjacent elongate conveyors, such as the conveyors 15 and 16. The previously described synchronous driving means 62 and 95 may again be employed for driving the endless conveyor loop 112 in synchronism with the conveyors 15 and 16 for a perfect transfer of the dough balls 12 from the compartment 65 on top of the conveyor 15 to the chambers 66 between the conveyors 15 and 16.

The endless conveyor loop 112 may be formed by an endless belt or an endless wire mesh of the type sometimes employed in bakery machinery.

A curved support 114 is attached to the mount 113 and holds a pair of retaining strips 115 for guiding the conveyor loop 112 in a concave path adjacent the conveyors 15 and 16. The retaining strips 115 retain and guide edge portions of the conveyor loop 112 in its concave path.

Dough balls 12 which leave the end of the conveyor 15 are guided and transferred by the concave auxiliary conveyor 112 to the next lower conveyor 16 for further transport thereby. Various ball sizes can readily be accommodated by adjusting the position of the mount 113 with the aid of adjustment screws 118, elongate slots 119, in the mount 113.

The proofer construction according to the subject invention and its preferred embodiments has various advantages not possessed by conventional machinery. In particular, the use of a series of distinct elongate conveyors instead of one endless conveyor system has the substantial advantage of preventing undue adherence of the dough balls to the conveyor parts. This is particularly important in the case of certain doughs, such as doughs employed in the making of tortillas, pizzas and similar goods, which have a strong tendency of sticking to surfaces to which they have been applied for a longer period of time. The construction according to the subject invention conveniently solves this problem by continually removing the dough balls from one conveyor and transferring it to another conveyor with the aid of the disclosed auxiliary conveying systems.

Moreover, the compartmentalization of the conveyor system into a series of distinct conveyors generally facilitates the manufacture of the proofer, renders it more easily repairable and significantly reduces unavoidable down time. It also makes for a very sanitary construction that is easily inspected and kept clean. Another advantage resides in the saving of floor space through a stacked construction.

Various modifications and variations within the spirit and scope of the subject invention will become apparent from, or will suggest themselves by, the subject extensive disclosure to those skilled in the art.

I claim:

1. Apparatus for proofing lumps of dough, comprising in combination:
    a series of elongate conveyors for successively transporting said lumps of dough, each conveyor having its own distinct endless conveyor loop;
    means for mounting said elongate conveyors into a spatially staggered relationship;
    means coupled to said conveyors for driving the endless conveyor loops of said conveyors;
    a plurality of auxiliary conveying systems each associated with a different pair of elongate conveyors for transferring lumps of dough from an end of one conveyor of the particular pair to a portion of the other conveyor of that particular pair spaced from an end of said other conveyor, said auxiliary conveying systems include a further endless conveyor loop being smaller than each of said conveyor loops of said series of elongate conveyors, means for mounting said further conveyor loop in the vicinity of an adjacent pair of elongate conveyors at a spacing from the adjacent pair of elongate conveyors sufficient for the transfer of lumps of dough between said further endless conveyor loop and the adjacent pair of elongate conveyors, and means for driving said further endless conveyor loop and said distinct endless conveyor loops in mutual synchronism, said mounting means including a curved support for guiding said further conveyor loop in a concave path adjacent the latter pair of elongate conveyors and a spaced pair of retaining strips for retaining and guiding edge portions of said further conveyor loop in said concave path;
    means for feeding lumps of dough to a first elongate conveyor in said series;
    means for deriving transported lumps of dough from a last elongate conveyor in said series;
    enclosure means for said elongate conveyors and said auxiliary conveying systems; and
    means for providing inside said enclosure means a proofing environment for said lumps of dough.

2. Apparatus as claimed in claim 1, wherein:
    said feeding means include an extension of the endless conveyor loop of said first conveyor to a feeding region outside said enclosure means.

3. Apparatus as claimed in claim 1, wherein:
    said driving means include means for driving the endless conveyor loops of each pair of adjacent conveyors in opposite senses.

4. Apparatus as claimed in claim 1, wherein:
    each elongate conveyor has a series of distinct compartments distributed along its conveyor loop for receiving lumps of dough;
    said mounting means include means for mounting adjacent pairs of conveyors in such proximity that corresponding compartments of conveyors in each adjacent pair of conveyors form traveling chambers for receiving lumps of dough;
    said driving means include means for moving adjacent compartments in temporal synchronism and spatial coincidence; and
    said auxiliary conveying systems include means for transferring lumps of dough from compartments of a conveyor to chambers between conveyors of an adjacent pair of conveyors.

5. Apparatus as claimed in claim 4, wherein:
    said compartments are delimited by conveyor cleats on said endless conveyor loops; and
    said driving means include means for moving conveyor cleats of adjacent conveyors in synchronism and spatial coincidence.

6. Apparatus as claimed in claim 1, wherein:
    said further endless conveyor loop includes an endless belt.

7. Apparatus as claimed in claim 1, wherein:
    said further endless conveyor loop includes an endless wire mesh.

8. Apparatus as claimed in claim 1, wherein:
    said auxiliary conveying systems are adjustable relative to said elongate conveyors to accommodate different sizes of lumps of dough.

* * * * *